(12) United States Patent
Ohori et al.

(10) Patent No.: US 12,418,180 B2
(45) Date of Patent: Sep. 16, 2025

(54) POWER DISTRIBUTION SYSTEM

(71) Applicant: Panasonic Intellectual Property Management Co., Ltd., Osaka (JP)

(72) Inventors: Takahiro Ohori, Osaka (JP); Kazunori Kidera, Osaka (JP); Tatsuo Koga, Osaka (JP); Kazuya Ohshima, Osaka (JP); Keita Kanamori, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 6 days.

(21) Appl. No.: 18/017,140

(22) PCT Filed: Jul. 20, 2021

(86) PCT No.: PCT/JP2021/027128
§ 371 (c)(1),
(2) Date: Jan. 20, 2023

(87) PCT Pub. No.: WO2022/044627
PCT Pub. Date: Mar. 3, 2022

(65) Prior Publication Data
US 2023/0268740 A1    Aug. 24, 2023

(30) Foreign Application Priority Data

Aug. 26, 2020    (JP) ................... 2020-142684

(51) Int. Cl.
*H02J 3/38*    (2006.01)
(52) U.S. Cl.
CPC ..................... *H02J 3/38* (2013.01)
(58) Field of Classification Search
CPC ...... H02J 3/38; H02J 1/10; H02J 1/102; H02J 1/084; H02J 5/00
See application file for complete search history.

(56) References Cited

U.S. PATENT DOCUMENTS

| 2010/0089607 | A1* | 4/2010 | Nakamura | ............ | H01L 25/072 |
| | | | | | 174/68.2 |
| 2011/0227412 | A1* | 9/2011 | Xu | ......................... | H02M 7/17 |
| | | | | | 307/24 |

(Continued)

FOREIGN PATENT DOCUMENTS

| JP | 2009-153301 A | 7/2009 |
| JP | 2009-178031 A | 8/2009 |

(Continued)

OTHER PUBLICATIONS

International Search Report for corresponding Application No. PCT/JP2021/027128, mailed Sep. 14, 2021.

(Continued)

*Primary Examiner* — Rexford N Barnie
*Assistant Examiner* — Rasem Mourad
(74) *Attorney, Agent, or Firm* — Renner, Otto, Boisselle & Sklar, LLP

(57) ABSTRACT

A power distribution system includes: a power distribution network that includes one or more connections to which a load is connectable; and a plurality of power supplies capable of supplying power to the power distribution network. Power is supplied to the power distribution network from at least one power supply of the plurality of power supplies. Adjacent power supplies included in the plurality of power supplies are arranged with a gap therebetween, and a connection included in the one or more connections is positioned in the gap.

10 Claims, 7 Drawing Sheets

(56) References Cited

U.S. PATENT DOCUMENTS

| | | | |
|---|---|---|---|
| 2016/0282892 A1* | 9/2016 | Saavedra | G06F 1/263 |
| 2017/0222436 A1* | 8/2017 | Wendt | H02J 1/08 |
| 2017/0331325 A1* | 11/2017 | Ristau | H02J 9/04 |
| 2019/0184922 A1 | 6/2019 | Tazarine et al. | |
| 2019/0334346 A1 | 10/2019 | Kawai | |
| 2020/0212683 A1* | 7/2020 | Hayashi | H02J 1/084 |
| 2020/0233441 A1* | 7/2020 | Morimoto | B60L 3/0076 |

FOREIGN PATENT DOCUMENTS

| | | |
|---|---|---|
| JP | 2010-68636 A | 3/2010 |
| JP | 2011-139556 A | 7/2011 |
| JP | 2015-95969 A | 5/2015 |
| JP | 2016-220352 A | 12/2016 |
| JP | 2019-41527 A | 3/2019 |
| JP | 2019-531954 A | 11/2019 |
| JP | 2020-120479 A | 8/2020 |
| WO | 2018/051600 A1 | 3/2018 |

OTHER PUBLICATIONS

Written Opinion for corresponding Application No. PCT/JP2021/027128, mailed Sep. 14, 2021.

* cited by examiner

POWER DISTRIBUTION SYSTEM

TECHNICAL FIELD

The present invention relates to a power distribution system.

BACKGROUND ART

Patent Literature (PTL) 1 discloses a distributed power supply system that supplies power to loads. This distributed power supply system includes a power supply device to which electric power generated by a plurality of power generation devices is input. The power supply device includes a power supply circuit, a storage battery, and an inverter for each of the power generation devices. The power supply circuit generates power with a predetermined voltage from the power generated by the power generation device. The storage battery is charged with power obtained from the power supply circuit, and the charged power is discharged. The inverter converts the power obtained from the power supply circuit and the storage battery into AC power, and outputs the converted power to the power line to which the load is connected. Additionally, in this distributed power supply system, the power supplied to the load is shared among the plurality of inverters and output according to each of the states of the plurality of storage batteries.

CITATION LIST

Patent Literature

[PTL 1] Japanese Unexamined Patent Application Publication No. 2016-220352

The present invention provides a power distribution system that easily reduces the drop in the voltage applied from the power supply to the load.

Solution to Problem

A power distribution system according to one aspect of the present invention includes: a power distribution network that includes one or more connections to which a load is connectable; and a plurality of power supplies capable of supplying power to the power distribution network. Power is supplied to the power distribution network from at least one power supply of the plurality of power supplies. Adjacent power supplies included in the plurality of power supplies are arranged with a gap therebetween, and a connection included in the one or more connections is positioned in the gap.

Advantageous Effects of Invention

The power distribution system of the present invention has the advantage that it is easy to reduce the drop in the voltage applied from the power supply to the load.

DESCRIPTION OF EMBODIMENTS

Hereinafter, embodiments will be specifically described with reference to the drawings. It should be noted that all the embodiments described below show comprehensive or specific examples. Numerical values, shapes, materials, components, arrangement positions and connection forms of components, steps, order of steps, and the like shown in the following embodiments are examples and are not intended to limit the present invention. In addition, among the components in the following embodiments, the components not described in independent claims will be described as optional components.

It should be noted that each figure is a schematic diagram and is not necessarily precisely illustrated. In addition, in each figure, the same symbol is denoted with respect to substantially the same feature, and the overlapping description may be omitted or simplified.

Embodiment

Configuration

Figure 1:
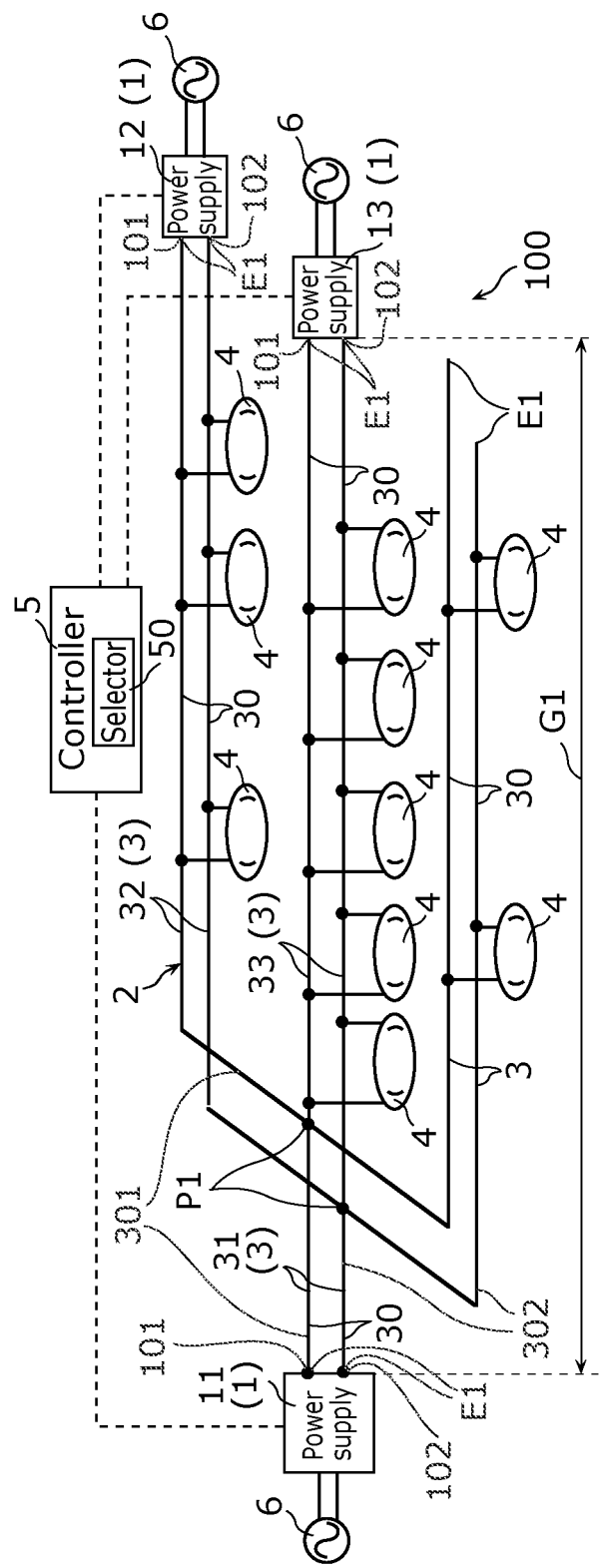
FIG. 1 is a schematic diagram showing the configuration of a power distribution system according to an embodiment.

The configuration of power distribution system 100 according to an embodiment will be described with reference to FIG. 1. FIG. 1 is a schematic diagram showing the configuration of power distribution system 100 according to the embodiment. Power distribution system 100 includes power distribution network 2 and a plurality of (three in the example shown in FIG. 1) power supplies 1. In the embodiment, each power supply 1 outputs DC power. Therefore, in the embodiment, power distribution network 2 is a so-called direct current (DC) power distribution network.

Power distribution network 2 shown in FIG. 1 is configured to include four feed lines 3. All of four feed lines 3 are linear in a plan view (that is, when viewed from a direction orthogonal to a plane including each feed line 3). One end of each of four feed lines 3 is connected to one branch point P1. For this reason, when power is supplied from power supply 1 to one of feed lines 3, power is also supplied to other feed lines 3 via branch point P1.

Each feed line 3 is composed of a pair of electric lines: positive feed line 301 connected to positive electrode 101 on the output side of power supply 1 and negative feed line 302 connected to negative electrode 102 on the output side of power supply 1. Therefore, in the embodiment, branch point P1 is a combination of two points: a connection point of positive feed line 301 of each of the plurality of feed lines 3 and connection point of negative feed line 302 of each of the plurality of feed lines 3. It should be noted that power distribution network 2 may include not only one branch point P1 but also a plurality of branch points P1. In addition, power distribution network 2 does not have to include branch point P1. That is, power distribution network 2 may include an aspect in which it is configured with only one feed line 3.

Each feed line 3 is configured by, for example, a duct rail, and one or more loads 4 is connectable. That is, one or more loads 4 can be placed at arbitrary positions on each feed line 3. In other words, each feed line 3 is connection 30 to which one or more loads 4 are connected. For this reason, it can be said that power distribution network 2 includes one or more connections 30 to which load 4 is connectable. Of course, each feed line 3 may be in such an aspect that a location to which one or more loads 4 is connectable is determined in advance. In the embodiment, each feed line 3 is arranged on the ceiling of the facility, but may be arranged on the floor, wall, furniture, or the like of the facility.

Power supply 1 can supply power to power distribution network 2. In the embodiment, power supply 1 is a power converter including an AC/DC converter. Power supply 1 converts AC power output from power system 6 into DC power, and outputs the converted DC power to feed line 3 to which power supply 1 is connected. The DC power output to feed line 3 is also output to other feed lines 3. It should be noted that in the embodiment, power supply 1 is only needed to be in an aspect that outputs DC power, and may be a distributed power supply such as a solar battery or a power supply such as a storage battery, or a combination of such a power supply and a power converter (e.g., a power converter with a DC/DC converter circuit).

Load 4 is driven by receiving power supplied from power supply 1 via feed line 3 by being connected to feed line 3 (connection 30). In the embodiment, load 4 is a lighting fixture, but it may be, for example, a speaker, camera, sensor, USB power delivery (PD), or the like. That is, load 4 may be a device other than a lighting fixture as long as it is in an aspect of being driven by receiving electric power. In addition, in the embodiment, loads 4 connected to respective feed lines 3 are all lighting fixtures, which are of one type, but more than one type of loads 4 may be connected to respective feed lines 3. For example, respective feed lines 3 may be connected to a lighting fixture, a speaker, a camera, a sensor, and a USB PD. All of these devices may be connected to one feed line 3 or may be connected separately to a plurality of feed lines 3.

In power distribution system 100 shown in FIG. 1, three power supplies 1 are arranged at open ends E1 of three feed lines 3 out of four feed lines 3, respectively. Open end E1 referred to here refers to one end of feed line 3 that is not connected to other feed lines 3. That is, in power distribution system 100 shown in FIG. 1, power distribution network 2 includes open ends E1. Additionally, at least one power supply 1 out of the plurality of power supplies 1 is arranged at open end E1.

In power distribution system 100 shown in FIG. 1, power supply 1 selected by selector 50 of controller 5, which is described later, out of three power supplies 1 supplies power to power distribution network 2. That is, power is supplied to power distribution network 2 from at least one power supply 1 out of the plurality of power supplies 1. In power distribution system 100 shown in FIG. 1, three power supplies 1 all have the same output voltage and rated output. Therefore, power is supplied to power distribution network 2 from power supply 1 having the same output voltage and rated output regardless of which power supply 1 is selected. The term "same" as used herein includes being exactly the same as well as being almost identical. That is, the output voltage and the rated output of each of the plurality of power supplies 1 are allowed to have an error of about several percent.

Additionally, in power distribution system 100 shown in FIG. 1, three power supplies 1 are arranged so as to sandwich one or more feed lines 3 from each other. As already mentioned, feed line 3 corresponds to connection 30. Therefore, adjacent power supplies 1 included in the plurality of power supplies 1 are arranged with gap G1 therebetween, and connection 30 is positioned in gap G1. That is, the plurality of power supplies 1 are not arranged so as to be centrally connected to one location of power distribution network 2, but are arranged so as to be dispersedly connected to a plurality of locations of power distribution network 2.

For example, in power distribution system 100 shown in FIG. 1, three power supplies 1 are assumed to be "first power supply 11", "second power supply 12", and "third power supply 13", respectively. Additionally, it is assumed that feed line 3 connected to first power supply 11 is "first feed line 31", feed line 3 connected to second power supply 12 is "second feed line 32", and feed line 3 connected to third power supply 13 is "third feed line 33". In this case, first feed line 31 and second feed line 32 are positioned between first power supply 11 and second power supply 12, and gap G1 between them corresponds to the sum of the wiring lengths of first feed line 31 and second feed line 32. In addition, second feed line 32 and third feed line 33 are positioned between second power supply 12 and third power supply 13, and gap G1 between them corresponds to the sum of the wiring lengths of second feed line 32 and third feed line 33. In addition, first feed line 31 and third feed line 33 are positioned between first power supply 11 and third power supply 13, and gap G1 between them corresponds to the sum of the wiring lengths of first feed line 31 and third feed line 33. It should be noted that in FIG. 1, only gap G1 between first power supply 11 and third power supply 13 is illustrated as an example.

Configuration Example of Power Distribution System

The configuration of power distribution system 100 shown in FIG. 1 is merely an example. Configuration examples of power distribution system 100 according to the embodiment are listed below. It should be noted that the Configuration examples listed below are merely examples, and power distribution system 100 according to the embodiment may have a configuration different from the Configuration examples listed below. In addition, in the Configuration examples listed below, the output voltage of each of the plurality of power supplies 1 needs to be the same, but the rated output may be the same or different from each other. In addition, in the Configuration examples listed below, only gap G1 between any two power supplies 1 out of the plurality of power supplies 1 is illustrated.

Figure 2A:
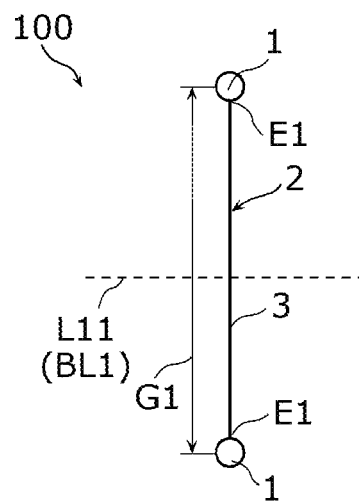
FIG. 2A is a schematic diagram showing Configuration example 1 of the power distribution system according to the embodiment.

FIG. 2A is a schematic diagram showing Configuration example 1 of power distribution system 100 according to the embodiment. In Configuration example 1, power distribution system 100 includes power distribution network 2 consisting of one feed line 3, and two power supplies 1. Feed line 3 is linear in a plan view. Additionally, two power supplies 1 are arranged at both ends of one feed line 3, in other words, one open end E1 and the other open end E1 of one feed line 3, respectively.

That is, in Configuration example 1, power distribution network 2 includes open end E1. Additionally, at least one power supply 1 out of the plurality of power supplies 1 is arranged at open end E1. In addition, in Configuration example 1, two power supplies 1 are arranged symmetrically with respect to straight line L11 passing through the center of one feed line 3. That is, in Configuration example 1, at least two power supplies 1 out of the plurality of power supplies 1 are arranged symmetrically across straight line L11 (reference line BL1) that intersects power distribution network 2 when power distribution network 2 is viewed in a plan view.

Figure 2B:
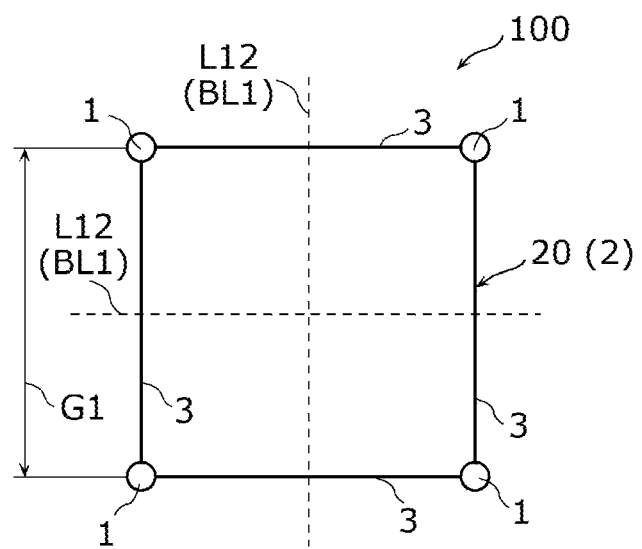
FIG. 2B is a schematic diagram showing Configuration example 2 of the power distribution system according to the embodiment.

FIG. 2B is a schematic diagram showing Configuration example 2 of power distribution system 100 according to the embodiment. In Configuration example 2, power distribution system 100 includes power distribution network 2 consisting of four feed lines 3, and four power supplies 1. All of four feed lines 3 are linear in a plan view. These four feed lines 3 are connected to each other to configure rectangular power distribution network 2 in a plan view. That is, in Configuration example 2, power distribution network 2 is ring network 20. Additionally, four power supplies 1 are arranged at a total of four connection points at which adjacent feed lines 3 are connected, respectively. For this reason, in Configuration example 2, four power supplies 1 are arranged with equal gaps in ring network 20.

That is, in Configuration example 2, power distribution network 2 includes at least ring network 20 configured in a ring. Additionally, at least two power supplies 1 out of the plurality of power supplies 1 are arranged in ring network 20 with gap G1 therebetween. In addition, in Configuration example 2, two power supplies 1 are arranged so as to be in line symmetry with respect to straight line L12 passing through the center of feed line 3 in any of feed lines 3. That is, in Configuration example 2, at least two power supplies 1 out of the plurality of power supplies 1 are arranged symmetrically across straight line L12 (reference line BL1) intersecting power distribution network 2 when power distribution network 2 is viewed in a plan view.

Figure 2C:
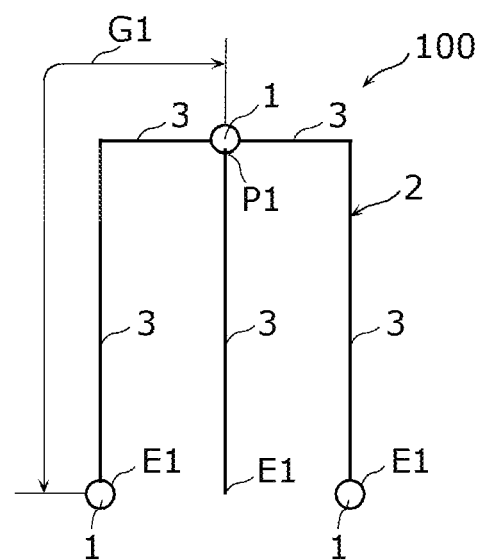
FIG. 2C is a schematic diagram showing Configuration example 3 of the power distribution system according to the embodiment.

FIG. 2C is a schematic diagram showing Configuration example 3 of power distribution system 100 according to the embodiment. In Configuration example 3, power distribution system 100 includes power distribution network 2 consisting of five feed lines 3, and three power supplies 1. All of five feed lines 3 are linear in a plan view. These five feed lines 3 are connected to each other to configure a comb-shaped power distribution network 2 in a plan view. Additionally, three power supplies 1 are arranged at branch point P1 where three feed lines 3 are connected to one another and open ends E1 of remaining two feed lines 3, respectively.

That is, in Configuration example 3, power distribution network 2 includes branch point P1 that branches into two or more feed lines 3. Additionally, at least one power supply 1 out of the plurality of power supplies 1 is arranged at branch point P1. In addition, in Configuration example 3, power distribution network 2 includes open end E1. Additionally, at least one power supply 1 out of the plurality of power supplies 1 is arranged at open end E1.

Figure 2D:
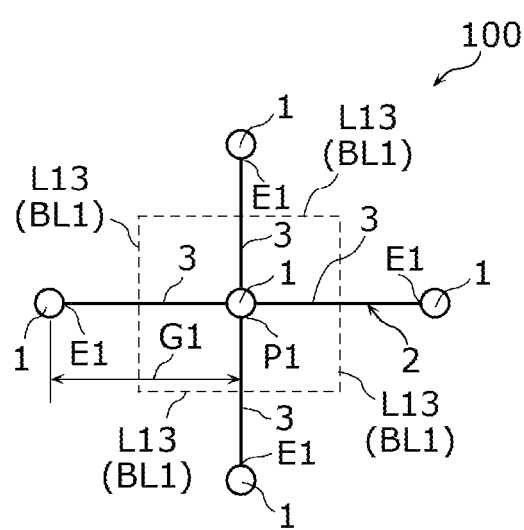
FIG. 2D is a schematic diagram showing Configuration example 4 of the power distribution system according to the embodiment.

FIG. 2D is a schematic diagram showing Configuration example 4 of power distribution system 100 according to the embodiment. In Configuration example 4, power distribution system 100 includes power distribution network 2 consisting of four feed lines 3, and five DC power supplies 1. All of four feed lines 3 are linear in a plan view. These four feed lines 3 are connected to one another to configure a cross-shaped power distribution network 2 in a plan view. Additionally, five power supplies 1 are arranged at a total of four open ends E1 included in respective four feed lines 3 and branch point P1 to which four feed lines 3 are connected, respectively.

That is, in Configuration example 4, power distribution network 2 includes branch point P1 that branches into two or more feed lines 3. Additionally, at least one power supply 1 out of the plurality of power supplies 1 is arranged at branch point P1. In addition, in Configuration example 4, power distribution network 2 includes open ends E1. Additionally, at least one power supply 1 out of the plurality of power supplies 1 is arranged at open end E1. Furthermore, in Configuration example 4, two power supplies 1 are arranged so as to be in line symmetry with respect to straight line L13 passing through the center of feed line 3 in any of feed lines 3. That is, in Configuration example 4, at least two power supplies 1 out of the plurality of power supplies 1 are arranged symmetrically across straight line L13 (reference line BL1) that intersects power distribution network 2 when power distribution network 2 is viewed in a plan view.

Figure 3A:
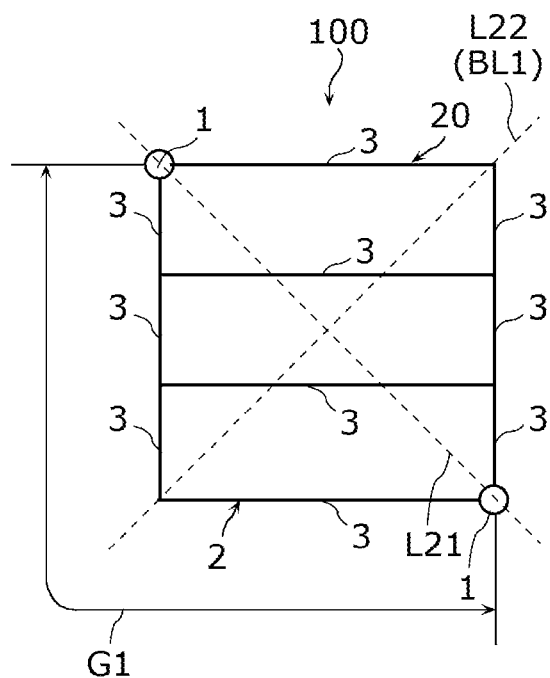
FIG. 3A is a schematic diagram showing Configuration example 5 of the power distribution system according to the embodiment.

FIG. 3A is a schematic diagram showing Configuration example 5 of power distribution system 100 according to the embodiment. In Configuration example 5, power distribution system 100 includes power distribution network 2 consisting of ten feed lines 3, and two power supplies 1. All of ten feed lines 3 are linear in a plan view. Eight feed lines 3 positioned outside out of ten feed lines 3 are connected to one another to configure ring network 20 that is rectangular in a plan view. In addition, remaining two feed lines 3 are connected to ring network 20 so as to divide ring network 20 into three. Additionally, two power supplies 1 are arranged at two corners, which are located on one diagonal line L21, out of the four corners of ring network 20, respectively. For this reason, in Configuration example 5, two power supplies 1 are arranged with equal gaps in ring network 20. In addition, it can be said that two power supplies 1 are arranged so as to be line-symmetrical with respect to the other diagonal line L22.

That is, in Configuration example 5, power distribution network 2 includes at least ring network 20 configured in a ring. Additionally, at least two power supplies 1 out of the plurality of power supplies 1 are arranged in ring network 20 with gap G1 therebetween. In addition, in Configuration example 5, at least two power supplies 1 out of the plurality of power supplies 1 are arranged in line symmetry with respect to diagonal line L22 (reference line BL1) intersecting power distribution network 2 when power distribution network 2 is viewed in a plan view.

Figure 3B:
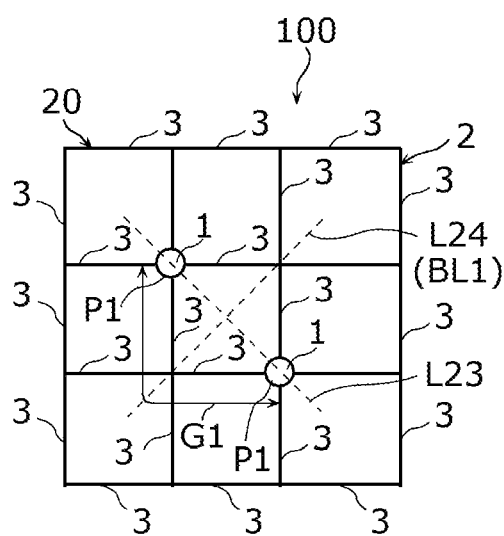
FIG. 3B is a schematic diagram showing Configuration example 6 of the power distribution system according to the embodiment.

FIG. 3B is a schematic diagram showing Configuration example 6 of power distribution system 100 according to the embodiment. In Configuration example 6, power distribution system 100 includes power distribution network 2 consisting of 24 feed lines 3, and two power supplies 1. All of 24 feed lines 3 are linear in a plan view. 24 feed lines 3 are connected to one another in a grid pattern so as to configure nine ring networks 20 each having a rectangular shape in a plan view. Additionally, two power supplies 1 are arranged at two corners, which are located on one diagonal line L23, out of the four corners of ring network 20 located at the center, respectively. For this reason, in Configuration example 6, two power supplies 1 are arranged with equal gaps in ring network 20. In addition, it can be said that two power supplies 1 are arranged so as to be in line symmetry with respect to the other diagonal line L24. Furthermore, two power supplies 1 are both arranged at branch point P1 to which four feed lines 3 are connected, and this branch point P1 has the largest number of branches (that is, number of connected feed lines 3) in power distribution network 2.

That is, in Configuration example 6, power distribution network 2 includes at least ring network 20 configured in a ring. Additionally, at least two power supplies 1 out of the plurality of power supplies 1 are arranged in ring network 20 with gap G1 therebetween. In addition, in Configuration example 6, at least two power supplies 1 out of the plurality of power supplies 1 are arranged symmetrically across diagonal line L24 (reference line BL1) intersecting power distribution network 2 when power distribution network 2 is viewed in a plan view. In addition, in Configuration example 6, power distribution network 2 includes branch point P1 that branches into two or more feed lines 3. Additionally, at least one power supply 1 out of the plurality of power supplies 1 is arranged at branch point P1. Furthermore, in Configuration example 6, there are a plurality of branch points P1. Additionally, at least one power supply 1 out of the plurality of power supplies 1 is arranged at branch point P1 having the largest number of branches out of the plurality of branch points P1.

Figure 3C:
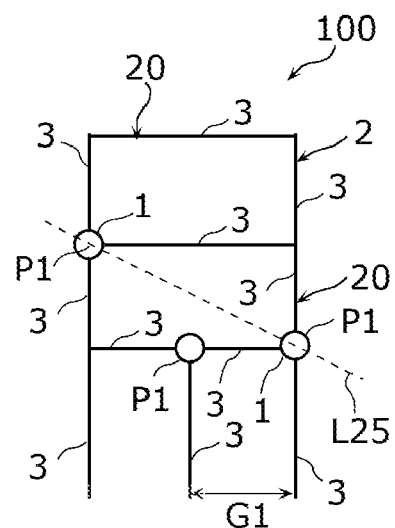
FIG. 3C is a schematic diagram showing Configuration example 7 of the power distribution system according to the embodiment.

FIG. 3C is a schematic diagram showing Configuration example 7 of power distribution system 100 according to the embodiment. In Configuration example 7, power distribution system 100 includes power distribution network 2 consisting of eleven feed lines 3, and three power supplies 1. All of eleven feed lines 3 are linear in a plan view. Eight feed lines 3 out of eleven feed lines 3 are connected to one another to configure two ring networks 20 that are rectangular in a plan view. Remaining three feed lines 3 are connected to these two ring networks 20 so as to extend outward from these two ring networks 20. Additionally, three power supplies 1 are arranged at two corners located on one diagonal line L25 out of the four corners of one ring network 20 (the lower one in FIG. 3C) out of two ring networks 20, and at the center of feed line 3 configuring the lower side of this ring network 20, respectively. For this reason, in Configuration example 7, three power supplies 1 are arranged in ring network 20 with gap G1 therebetween. In addition, three power supplies 1 are all arranged at branch point P1, and this branch point P1 has the largest number of branches (that is, number of connected feed lines 3) in power distribution network 2.

That is, in Configuration example 7, power distribution network 2 includes at least ring network 20 configured in a ring. Additionally, at least two power supplies 1 out of the plurality of power supplies 1 are arranged in ring network 20 with gap G1 therebetween. In addition, in Configuration example 7, power distribution network 2 includes branch point P1 that branches into two or more feed lines 3. Additionally, at least one power supply 1 out of the plurality of power supplies 1 is arranged at branch point P1. Furthermore, in Configuration example 7, there are a plurality of branch points P1. Additionally, at least one power supply 1 out of the plurality of power supplies 1 is arranged at branch point P1 having the largest number of branches out of the plurality of branch points P1.

Figure 3D:
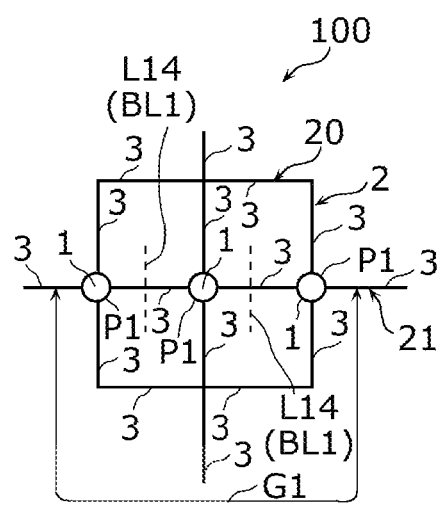
FIG. 3D is a schematic diagram showing Configuration example 8 of the power distribution system according to the embodiment.

FIG. 3D is a schematic diagram showing Configuration example 8 of power distribution system 100 according to the embodiment. In Configuration example 8, power distribution system 100 includes power distribution network 2 consisting of sixteen feed lines 3, and three power supplies 1. All of sixteen feed lines 3 are linear in a plan view. Eight feed lines 3 out of sixteen feed lines 3 are connected to one another to configure ring network 20 having a rectangular shape in a plan view. Remaining eight feed lines 3 are connected to one another to configure cruciform network 21 that intersects at the center of ring network 20 and is cross-shaped in a plan view. Additionally, three power supplies 1 are arranged with equal gaps along one (the line in the left-right direction in FIG. 3D) of the two lines configuring cruciform network 21. Here, two power supplies 1 out of three power supplies 1 are arranged with gap G1 in ring network 20. In addition, three power supplies 1 are arranged such that any two power supplies 1 adjacent to each other are in line symmetry with respect to straight line L14 passing through the center of feed line 3. Furthermore, three power supplies 1 are all arranged at branch point P1, and this branch point P1 has the largest number of branches (that is, number of connected feed lines 3) in power distribution network 2.

That is, in Configuration example 8, power distribution network 2 includes at least ring network 20 configured in a ring. Additionally, at least two power supplies 1 out of the plurality of power supplies 1 are arranged in ring network 20 with gap G1 therebetween. In addition, in Configuration example 8, at least two power supplies 1 out of the plurality of power supplies 1 are arranged symmetrically across straight line L14 (reference line BL1) that intersects power distribution network 2 when power distribution network 2 is viewed in a plan view. In addition, in Configuration example 8, power distribution network 2 includes branch point P1 that branches into two or more feed lines 3. Additionally, at least one power supply 1 out of the plurality of power supplies 1 is arranged at branch point P1. Furthermore, in Configuration example 8, there are a plurality of branch points P1. Additionally, at least one power supply 1 out of the plurality of power supplies 1 is arranged at branch point P1 having the largest number of branches out of the plurality of branch points P1.

Controller

Power distribution system 100 according to the embodiment includes controller 5 having a power supply control function for individually controlling a plurality of power supplies 1. Controller 5 includes selector 50. Controller 5 is, for example, a microcomputer or a device including a microcomputer. A microcomputer is a semiconductor integrated circuit or the like including ROM and RAM in which a program is stored, a processor (CPU: Central Processing Unit) for executing the program, a timer, an A/D converter, a D/A converter, and the like. The power supply control function and selector 50 are implemented by the processor executing the above program.

Selector 50 selects one or more power supplies 1 that supply power from the plurality of power supplies 1 to power distribution network 2. That is, in the embodiment, power is supplied to power distribution network 2 from one or more power supplies 1 selected by selector 50 instead of being supplied from all of power supplies 1 to power distribution network 2. Of course, power may be supplied from all of power supplies 1 to power distribution network 2.

Selection examples of one or more power supplies 1 by selector 50 are listed below. Noted that it is assumed that power is supplied from all of power supplies 1 to power distribution network 2 before selector 50 selects one or more power supplies 1 according to any of the following Selection examples. Here, the reason why power is supplied from all of power supplies 1 before selecting one or more power supplies 1 is to detect the power required for power distribution network 2. It should be noted that if selector 50 can grasp in advance the power required for power distribution network 2, it is not necessary to supply power from all of power supplies 1 before selecting one or more power supplies 1. For example, if selector 50 can communicate with all of loads 4 by wire or wirelessly, and can detect in advance loads 4 to be driven and the power required to drive loads 4, it is possible for selector 50 to grasp the power required for power distribution network 2 in advance. In addition, power is not supplied to power distribution network 2 from one or more power supplies 1 that are not selected, in any of the following Selection examples.

Selection example 1 is an example in which selector 50 functions as the "first selector". That is, in Selection example 1, selector (first selector) 50 selects, from the plurality of power supplies 1, one or more power supplies 1 that supply power to power distribution network 2 according to the total output power supplied from the plurality of power supplies 1 to power distribution network 2. In Selection example 1, controller 5 periodically acquires the output power measured at one or more power supplies 1 by communicating with one or more power supplies 1 connected to power distribution network 2 by wire or wirelessly. The cycle of acquiring the output power corresponds to, for example, the cycle in which each power supply 1 measures its output power. Accordingly, controller 5 acquires the output power of all of power supplies 1 in power distribution network 2.

In addition, in Selection example 1, controller 5 can grasp the rated output of each of the plurality of power supplies 1 through communication.

Additionally, selector 50 selects one or more power supplies 1 from the plurality of power supplies 1 according to the acquired total output power of all of power supplies 1. For example, it is assumed that power supplies 1 each have the same rated output of 200 W. In this case, selector 50 selects one power supply 1 if the total output power of all of power supplies 1 acquired is 100 W, selects two power supplies 1 if the total output power is 300 W, and selects three power supplies 1 if the total output power is 500 W.

In addition, for example, it is assumed that the rated outputs of the plurality of power supplies 1 are different from one another, and that there are power supply 1 with a rated output of 200 W, power supply 1 with a rated output of 400 W, and power supply 1 with a rated output of 600 W. In this case, if the total output power of all of power supplies 1 acquired is 100 W, selector 50 selects one of power supplies 1 with rated outputs of 200 W, 400 W, and 600 W, if the rated output is 300 W, it selects one of power supplies 1 of 400 W and 600 W, and if the power supply is 500 W, it selects power supply 1 with a rated output of 600 W.

Here, in the embodiment, as already mentioned, all of the plurality of power supplies 1 are AC/DC converters (that is, power converters). In this case, in Selection example 1, selector (first selector) 50 may select power supply 1 with the highest conversion efficiency from the plurality of power supplies 1, as power supply 1 that supplies power to power distribution network 2.

Figure 4:
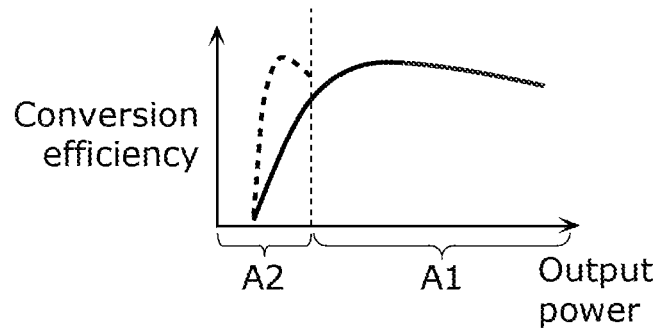
FIG. 4 is a diagram showing the characteristics of the conversion efficiency of a power supply.

This aspect will be described below with reference to FIG. 4. FIG. 4 is a diagram showing the characteristics of the conversion efficiency of power supply 1. In FIG. 4, the vertical axis represents the conversion efficiency of power supply 1 and the horizontal axis represents the output power of power supply 1. In FIG. 4, the solid line represents the conversion efficiency characteristics of power supply 1 with a relatively high rated output, and the dotted line represents the conversion efficiency characteristics of power supply 1 with a relatively low rated output. Each of power supplies 1 has characteristics such that the conversion efficiency peaks when supplying an output power slightly smaller than the rated output. As shown in FIG. 4, power supply 1 with a relatively high rated output has a high conversion efficiency in first region A1 where the output power (power consumption of all loads 4) is relatively high, but the conversion efficiency becomes small and the loss increases in second region A2 where the output power is relatively small. On the other hand, since power supply 1 with a relatively low rated output has a high conversion efficiency even in second region A2, it is possible to suppress an increase in loss.

Therefore, it is preferable that selector (first selector) 50 selects power supply 1 with the highest conversion efficiency from the plurality of power supplies 1 according to the total output power of all of power supplies 1 as power supply 1 that supplies power to power distribution network 2. For example, it is assumed that there are power supply 1 with a rated output of 200 W and power supply 1 with a rated output of 600 W. In this case, if the acquired total output power of all of power supplies 1 is 100 W, selector 50 selects power supply 1 with a rated output of 200 W.

Selection example 2 is an example in which selector 50 functions as the "second selector". That is, in Selection example 2, selector (second selector) 50 selects, from the plurality of power supplies 1, one or more power supplies 1 that supply power to power distribution network 2 according to the position of load 4. In Selection example 2, controller 5 acquires position information from one or more loads 4 by communicating with one or more loads 4 connected to power distribution network 2 by wire or wirelessly. The timing of acquiring the position information is, for example, the timing when load 4 is powered on. The position information is, for example, information representing the position (coordinates) in the facility where power distribution system 100 is arranged. The position information of load 4 can be acquired using, for example, a local positioning system (LPS) using Bluetooth (registered trademark) Low Energy (BLE) or the like.

In addition, in Selection example 2, controller 5 acquires position information from one or more power supplies 1 by communicating with one or more power supplies 1 connected to power distribution network 2 by wire or wirelessly. For example, the position of each of power supplies 1 is stored in the memory of controller 5 by acquiring using the LPS described above.

Additionally, selector 50 selects one or more power supplies 1 from the plurality of power supplies 1 according to the acquired position information of load 4. Specifically, selector 50 selects power supply 1 positioned closest to the position of load 4 from the plurality of power supplies 1. For example, when there are a plurality of loads 4 that are powered on, selector 50 selects power supply 1 that has the smallest sum of the distances from the plurality of loads 4. It should be noted that if the power supplied to power distribution network 2 is insufficient only with selected power supply 1, selector 50 is only needed to further select power supply 1 that is positioned next closest to the position of load 4.

Selection example 3 is an example in which selector 50 functions as both the "first selector" and the "second selector". In Selection example 3, selector 50 first selects one power supply 1 from the plurality of power supplies 1 according to the acquired position information of load 4. In addition, the total output power acquired at the time when power is supplied from all of power supplies 1 to power distribution network 2 is compared with the rated output of selected power supply 1. As a result of the comparison, if the power supplied to power distribution network 2 is insufficient only with selected power supply 1, selector 50 selects one or more power supplies 1 out of the plurality of power supplies 1 according to the power which is insufficient only with selected power supply 1 out of the acquired total output power of all of power supplies 1. That is, in Selection example 3, selector 50 first functions as the second selector, and then functions as the first selector when the power supplied to power distribution network 2 is insufficient.

An example of the operation in Selection example 3 will be described below using Configuration example 3 (FIG. 2C) of power distribution network 2. In Configuration example 3, it is assumed that power supply 1 with a rated output of 50 W (here, referred to as "power supply α") is arranged at branch point P1. In addition, it is assumed that power supply 1 with a rated output of 80 W (here, referred to as "power supply β") is arranged at open end E1 of feed line 3 located on the leftmost side, and power supply 1 with a rated output of 60 W (here, referred to as "power supply γ") is arranged at open end E1 of feed line 3 located on the rightmost side. Furthermore, it is assumed that load 4 is connected in the middle of feed line 3 located at the center, and that the power consumption of load 4 is 120 W when the power is turned on.

In this case, selector 50 first selects power supply α positioned closest to load 4 from the plurality of power supplies α, β, and γ. In addition, the total output power (here, 120 W) obtained at the time when power is supplied from all of power supplies 1 to power distribution network 2 is compared with the rated output (here, 50 W) of selected power supply α. As a result of the comparison, the power supplied to power distribution network 2 is insufficient by 70 W (=120 W−50 W) with only power supply α, so that selector 50 selects power supply β from remaining power supplies β and γ depending on the shortfall (here, 70 W) of the acquired total output power of all of power supplies 1. Accordingly, the power supplied to power distribution network 2 exceeds the power consumption of load 4.

Advantages

Figure 5:
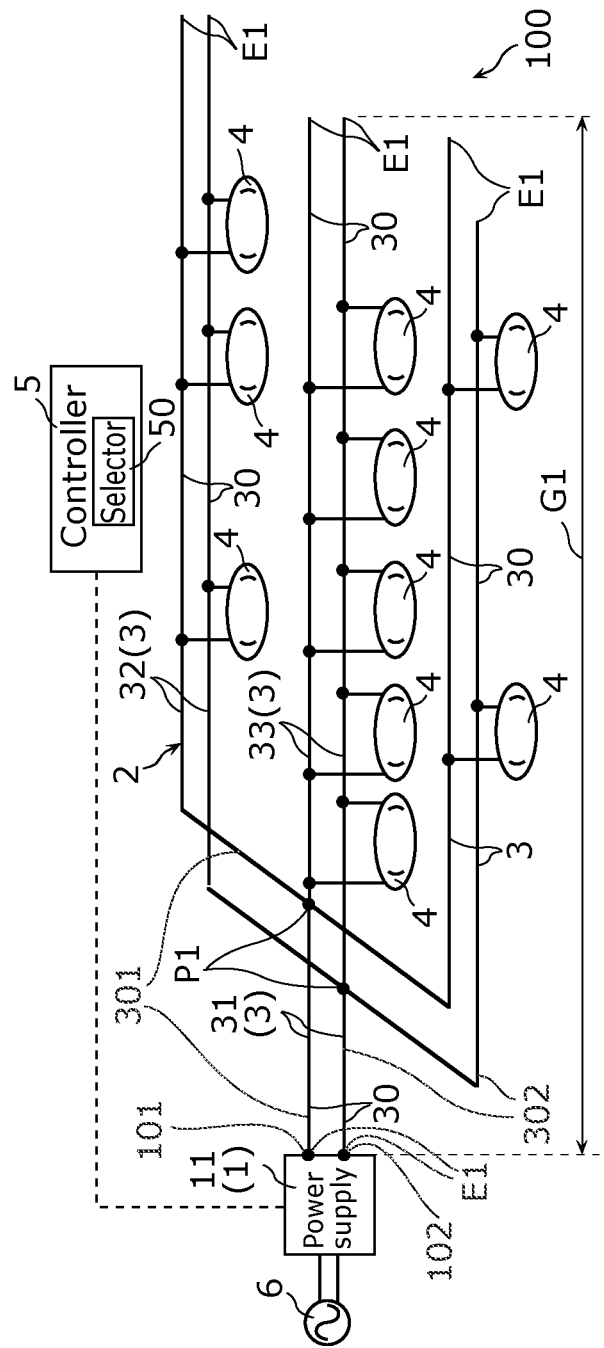
FIG. 5 is a schematic diagram showing the configuration of a power distribution system of a comparative example.

Advantages of power distribution system 100 according to the embodiment will be described below in comparison with power distribution system 200 of the comparative example. FIG. 5 is a schematic diagram showing the configuration of power distribution system 200 of a comparative example. Power distribution system 200 of the comparative example differs from power distribution system 100 according to the embodiment in that only one power supply 1 is included.

In power distribution system 200 of the comparative example, the farther load 4 connected to feed line 3 (connection 30) from power supply 1, the longer the distance between load 4 and power supply 1, that is, the wiring length. Therefore, in power distribution system 200 of the comparative example, there is a problem that the farther load 4 is from power supply 1, the larger the drop in the voltage due to the resistance of feed line 3, which depends on the wiring length. For example, in the example shown in FIG. 5, the voltage applied to load 4 located farthest from power supply 1 in central feed line 3 becomes smaller than the voltage applied to load 4 located closest to power supply 1 to the extent that it cannot be ignored due to the drop in the voltage caused by the wiring length.

On the other hand, in power distribution system 100 according to the embodiment, adjacent power supplies 1 included in the plurality of power supplies 1 are arranged with gap G1 therebetween, and feed line 3 (connection 30) is positioned in gap G1. That is, in power distribution system 100 according to the embodiment, the plurality of power supplies 1 are not arranged so as to be centrally connected to one location of power distribution network 2, but are arranged so as to be dispersedly connected to a plurality of locations of power distribution network 2. For this reason, in power distribution system 100 according to the embodiment, by appropriately selecting one or more power supplies 1 from the plurality of power supplies 1, the distance between load 4 connected to feed line 3 (connection 30) and power supply 1 can be shortened compared to power distribution system 200 of the comparative example. As a result, in power distribution system 100 according to the embodiment, there is an advantage that the drop in the voltage applied from power supply 1 to load 4 is easily reduced.

Other Embodiments

Although the embodiment has been described above, the present invention is not limited to the above embodiment. Variations of the embodiment are listed below. Variations described below may be combined as appropriate.

In the embodiment, each of the plurality of power supplies 1 is arranged so as to sandwich feed line 3, but the present invention is not limited thereto. For example, one or more power supplies 1 out of the plurality of power supplies 1 may be arranged in the middle of feed line 3. Even in this case, connection 30 included in one or more connections 30 (a part of feed line 3) is positioned between adjacent power supplies 1.

In the embodiment, when there are a plurality of gaps G1 between adjacent power supplies 1, these gaps G1 may not be equal to one another. That is, these gaps G1 may be different from one another. For example, when three power supplies 1 are arranged in ring network 20, there are three gaps G1 between adjacent power supplies 1, and these gaps G1 may be equal to or different from one another. When a plurality of gaps G1 are different from one another, it is preferable that all of these gaps G1 are within a range based on the average value of all of gaps G1. That is, there are a plurality of gaps G1, and each of the plurality of gaps G1 is preferably at least 0.5 times and at most 2 times the average value of the plurality of gaps G1.

In the embodiment, feed line 3 is linear in a plan view, for example, as shown in FIG. 1, but it is not limited thereto. For example, feed line 3 may have a partially bent shape such as a broken line shape in a plan view, or may have a partially curved shape such as a wavy line shape in a plan view.

In the embodiment, ring network 20 has a rectangular shape in a plan view as shown in FIG. 2B and FIG. 3B to FIG. 3D, but is not limited thereto. For example, ring network 20 may have a circular shape in a plan view, or may have a polygonal shape. In other words, ring network 20 does not have open end E1 and only needs to configure a closed loop.

In the embodiment, power distribution network 2 is a DC power distribution network, but it is not limited thereto. For example, power distribution network 2 may be an AC power distribution network supplied with alternating current power. In this case, each power supply 1 is only needed to be an aspect which outputs alternating current power. For example, each power supply 1 is a power converter with a DC/AC converter.

In the embodiment, power distribution system 100 includes controller 5, but the present invention is not limited thereto. For example, in power distribution system 100, instead of including controller 5, one power supply 1 out of the plurality of power supplies 1 may include a function as controller 5. In this aspect, controller 5 is not required. In addition, in this aspect, power supply 1 functioning as controller 5 is the master, and power supplies 1 other than it are slaves, so that wired or wireless communication can be configured between the master and the slaves. Additionally, power supply 1 that is the master individually controls all of power supplies 1 including itself as controller 5 by instructing power supplies 1 that are the slaves.

Summary

As described above, power distribution system 100 includes: power distribution network 2 that includes one or more connections 30 to which load 4 is connectable; and a plurality of power supplies 1 capable of supplying power to power distribution network 2. Power is supplied to power distribution network 2 from at least one power supply 1 of the plurality of power supplies 1. Adjacent power supplies included in the plurality of power supplies 1 are arranged with gap G1 therebetween, and connection 30 included in one or more connections 30 is positioned in gap G1.

According to such power distribution system 100, the plurality of power supplies 1 are not arranged so as to be centrally connected to one location of power distribution network 2, but are arranged so as to be dispersedly connected to a plurality of locations of power distribution network 2. Therefore, according to power distribution system 100, there is an advantage that the distance between load 4 connected to connection 30 and power supply 1 is easily shortened, and as a result, the drop in the voltage applied from power supply 1 to load 4 is easily reduced.

In addition, for example, in power distribution system 100, power distribution network 2 includes branch point P1 that branches into two or more feed lines 3. At least one power supply 1 out of the plurality of power supplies 1 is arranged at branch point P1.

According to such power distribution system 100, there is an advantage that the number of required power supplies 1 is reduced easily while achieving the effect that the drop in the voltage applied from power supply 1 to load 4 is easily reduced.

In addition, for example, in power distribution system 100, there are a plurality of branch points P1. At least one power supply 1 out of the plurality of power supplies 1 is arranged at branch point P1 having the largest number of branches out of the plurality of branch points P1.

According to such power distribution system 100, there is an advantage that the number of required power supplies 1 is further reduced easily while achieving the effect that the drop in the voltage applied from power supply 1 to load 4 is easily reduced.

In addition, for example, in power distribution system 100, power distribution network 2 includes open end E1. At least one power supply 1 out of the plurality of power supplies 1 is arranged at open end E1.

According to such power distribution system 100, there is an advantage that when there is only one power supply 1, power supply 1 is arranged at open end E1 which is likely to be the farthest position from power supply 1, so that the distance between load 4 connected to connection 30 and power supply 1 is easily shortened.

In addition, for example, in power distribution system 100, power distribution network 2 includes at least ring network 20 configured in a ring. At least two power supplies 1 out of the plurality of power supplies 1 are arranged in ring network 20 with gap G1 therebetween.

According to such power distribution system 100, there is an advantage that the distance between load 4 connected to connection 30 and power supply 1 is easily shortened compared to the case where only one power supply 1 is arranged in ring network 20.

In addition, for example, in power distribution system 100, there are a plurality of gaps G1, and each of the plurality of gaps G1 is at least 0.5 times and at most 2 times the average value of the plurality of gaps G1.

According to such power distribution system 100, there is an advantage that the distance between load 4 connected to connection 30 and power supply 1 is easily shortened while securing the degree of freedom of the position of power supply 1, compared to the case where the plurality of power supplies 1 are arranged with equal gaps.

In addition, for example, in power distribution system 100, at least two power supplies 1 out of the plurality of power supplies 1 are arranged symmetrically across reference line BL1 that intersects power distribution network 2 when power distribution network 2 is viewed in a plan view.

According to such power distribution system 100, there is an advantage that the distance between load 4 connected to connection 30 and power supply 1 is easily shorten compared to the case where the plurality of power supplies 1 are randomly arranged in power distribution network 2.

In addition, for example, power distribution system 100 further includes selector (first selector) 50 that selects, from the plurality of power supplies 1, one or more power supplies 1 that supply power to power distribution network 2 according to the total output power supplied from the plurality of power supplies 1 to power distribution network 2.

According to such power distribution system 100, there is an advantage that loss can be reduced compared to the case where all power supplies 1 are operated to supply power to power distribution network 2.

In addition, for example, in power distribution system 100, the plurality of power supplies 1 are power converters. Selector (first selector) 50 selects power supply 1 with the highest conversion efficiency from the plurality of power supplies 1, as power supply 1 that supplies power to power distribution network 2.

According to such power distribution system 100, there is an advantage that it is easy to further reduce the loss in power supply 1 compared to the case where power supply 1 with poor conversion efficiency is selected.

In addition, for example, power distribution system 100 further includes selector (second selector) 50 that selects, from the plurality of power supplies 1, one or more power supplies 1 that supply power to power distribution network 2 according to the position of load 4.

According to such power distribution system 100, there is an advantage that power supply 1 can be selected so that the distance between load 4 and power supply 1 is as short as possible, and as a result, it is easy to reduce the drop in the voltage applied from power supply 1 to load 4.

100 Power distribution system
1 Power supply (power converter)
101 Positive electrode
102 Negative electrode
2 Power distribution network
20 Ring network
3 Power supply lineFeed line
30 Connector
301 Positive feed line
302 Negative feed line
4 Load
50 Selector (first selector, second selector)
BL1 Reference line
E1 Open end
G1 Gap
P1 Branch point

The invention claimed is:

1. A power distribution system comprising:
a plurality of loads;
a power distribution network; and
a plurality of power supplies,
wherein the power distribution network includes one or more feed lines to which the plurality of loads are connectable, wherein each feed line comprises a positive feed line connected to a positive electrode on an output side of a respective power supply of the plurality of power supplies and a negative feed line connected to a negative electrode on the output side of the respective power supply;
wherein each of the plurality of power supplies is capable of supplying power to the power distribution network,
wherein power is supplied to the power distribution network from at least one power supply out of the plurality of power supplies,
wherein adjacent power supplies included in the plurality of power supplies are arranged with a gap therebetween, such that the plurality of power supplies are arranged to be dispersedly connected to a plurality of locations of the power distribution network and a feed line included in the one or more feed lines is positioned in the gap between two adjacent power supplies, and
wherein the power distribution system further comprises a second selector that selects, according to positions of the plurality of loads, a power supply that supplies power to the power distribution network from the plurality of power supplies, the power supply selected having a smallest sum of distances from the plurality of loads among the plurality of power supplies.

2. The power distribution system according to claim 1, wherein the power distribution network includes a branch point that branches into two or more feed lines, and
at least one power supply out of the plurality of power supplies is arranged at the branch point.

3. The power distribution system according to claim 2, wherein the power distribution system comprises a plurality of branch points, wherein each branch point branches into two or more feed lines, and
at least one power supply out of the plurality of power supplies is arranged at a branch point with a largest number of branches out of the plurality of branch points.

4. The power distribution system according to claim 1, wherein the power distribution network includes an open end, and
at least one power supply out of the plurality of power supplies is arranged at the open end.

5. The power distribution system according to claim 1, wherein the power distribution network includes at least a ring network configured in a form of a ring, and
at least two power supplies out of the plurality of power supplies are arranged with the gap in the ring network.

6. The power distribution system according to claim 1 wherein the power distribution system comprises at least three power supplies;
wherein any two adjacent power supplies included in the at least three power supplies are arranged with a respective gap out of a plurality of gaps therebetween, and
wherein each of the plurality of gaps is at least 0.5 times and at most 2 times an average value of the plurality of gaps.

7. The power distribution system according to claim 1, wherein at least two power supplies out of the plurality of power supplies are arranged symmetrically across a reference line that intersects the power distribution network when the power distribution network is viewed in a plan view.

8. The power distribution system according to claim 1, further comprising:
a first selector that selects, from the plurality of power supplies, one or more power supplies that supply power to the power distribution network according to a total output power supplied from the plurality of power supplies to the power distribution network.

9. The power distribution system according to claim 8, wherein the plurality of power supplies are power converters, and
the first selector selects a power supply with a highest conversion efficiency from the plurality of power supplies, as a power supply that supplies power to the power distribution network.

10. A power distribution system comprising:
a plurality of loads;
a power distribution network; and
a plurality of power supplies,
wherein the power distribution network includes one or more feed lines to which the plurality of loads are connectable, wherein each feed line comprises a positive feed line connected to a positive electrode on an output side of a respective power supply of the plurality of power supplies and a negative feed line connected to a negative electrode on the output side of the respective power supply;
wherein each of the plurality of power supplies is capable of supplying power to the power distribution network,
wherein power is supplied to the power distribution network from at least one power supply out of the plurality of power supplies,
wherein adjacent power supplies included in the plurality of power supplies are arranged with a gap therebetween, such that the plurality of power supplies are arranged to be dispersedly connected to a plurality of locations of the power distribution network and a feed line included in the one or more feed lines is positioned in the gap between two adjacent power supplies,
the power distribution network includes an open end at which none of the plurality of power supplies is arranged, and
wherein the power distribution system further comprises a second selector that selects, according to positions of the plurality of loads, a power supply that supplies power to the power distribution network from the plurality of power supplies, the power supply selected having a smallest sum of distances from the plurality of loads among the plurality of power supplies.

* * * * *